ial No. 386,109

2,769,009

ISONICOTINIC ACID HYDRAZONES OF BICYCLIC TERPENIC KETONES

Gino Carrara, Milan, Italy, assignor to Lepetit S. p. A., Milan, Italy

No Drawing. Application October 14, 1953, Serial No. 386,109

6 Claims. (Cl. 260—295)

The present invention relates to new chemical compounds and in particular to acylhydrazones of bicylic terpenic ketones which may be represented by the general formula

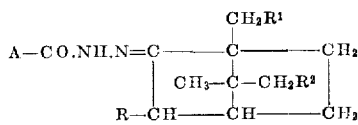

wherein A—CO— represents the isonicotinyl radical; R is hydrogen, carboxy or a sulfo group; $R^1$ and $R^2$ are hydrogen or, in the case R is hydrogen, $R^1$ may be hydrogen and $R^2$ a sulfo group or vice-versa. The carboxy and sulfo groups may be present as such or salified with an alkali or alkaline earth metal.

These chemical compounds possess a considerable antibacterial activity, owing to the presence in their molecule of the isonicotinylhydrazino group, which has been recently found to have most powerful antitubercular properties, and of the radical of bicyclic terpenic ketones, the pharmaceutical importance of such ketones likewise known.

The compounds of the present invention are obtained by condensing isonicotinic acid hydrazide with a bicylic terpenic ketone. It is well known that isonicotinic acid hydrazide displays an outstanding antibacterial activity, as is described, for instance, by E. Grunberg and R. J. Schnitzes, in Quarterly Review of Sea View Hospital 13 (1), 3 (1952) and by many other scientists. I have now found that isonicotinylhydrazones of bicyclic terpenic ketones possess both the important pharmacological properties of isonicotinylhydrazide and of the bicyclic terpenic ketone. The new compounds are administered in the same manner and for the same purposes as the known isonicotinylhydrazide, the dosage with respect to the isonicotinylhydrazide moiety being likewise the same, i. e., about 50 mg. per dose.

The process for obtaining the compounds of the present invention is a very simple one and comprises reacting isonicotinylhydrazide of the formula

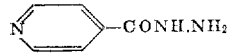

with a bicyclic terpenic ketone of the general formula

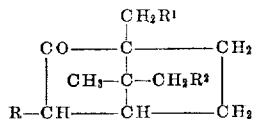

wherein R, $R^1$ and $R^2$ have the same significance as indicated above. More particularly, 1 mole of hydrazide and a slight excess over 1 mole of a bicyclic terpenic ketone are refluxed in a lower aliphatic alcohol, whereby the condensation product precipitates and is directly collected after cooling.

It is quite apparent that, should the condensation compound be soluble in the employed lower aliphatic alcohol, the resulting solution should be evaporated to dryness and the residue recrystallized from an appropriate solvent.

The invention is illustrated by the following examples.

Example 1

A mixture of 13.7 g. isonicotinic acid hydrazide, 24.3 g. d-10-camphosulfonic acid and 100 ml. 95% ethyl alcohol is refluxed for 30 minutes. At first a complete solution forms, which readily separates a growing precipitate. After cooling, the solid mass is collected in vacuo and dried. M. P. 300–302° (decomposition).

$$[\alpha]_D^{20} = -73.91° \text{ (water)}$$

The product is d-10-camphosulfonic acid isonicotinylhydrazone.

Example 2

A mixture of 13.7 g. isonicotinic acid hydrazide, 20.55 g. d-3-camphocarboxylic acid and 100 ml. 95% ethyl alcohol is refluxed for 20 minutes. At first a complete solution forms, which readily separates a precipitate. After cooling, the solid is filtered in vacuo and dried.

31.5 g. of the obtained d-3-camphocarbonic acid isonicotinylhydrazone are suspended in 100 ml. water, thereafter 100 ml. of 0.1-n NaOH solution are added. The solution is evaporated in vacuo to dryness, and the residue is recrystallized from 95% ethyl alcohol. The resulting product is the sodium salt of d-3-camphocarboxylic acid isonicotinylhydrazone.

Example 3

A mixture of 13.7 g. isonicotinic acid hydrazide, 16 g. d-camphor and 100 ml. isoamyl alcohol is refluxed for 2 hrs. From the solution which at first forms there separates slowly a growing crystal mass, which is then collected in vacuo and dried. M. P. 196–198°.

$$[\alpha]_D^{20} = -47.24°$$

(ethyl alcohol). The product is d-camphor isonicotinylhydrazone.

By procedures analogous to those described hereinabove, d-3-camphosulfonic acid isonicotinylhydrazone can be prepared by reacting isonicotinic acid hydrazide with d-3-camphosulfonic acid.

What I claim is:

1. A compound of the group consisting of isonicotinylhydrazones of the formula

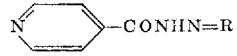

wherein R is a bivalent radical of the class consisting of 2-camphanylidene, 3-carboxy-2-camphanylidene, 3-sulfo-2-camphanylidene, 8-sulfo-2-camphanylidene, and 10-sulfo-2-camphanylidene; and their alkali and alkaline earth metal salts.

2. The compound d-camphor isonicotinylhydrazone of the formula

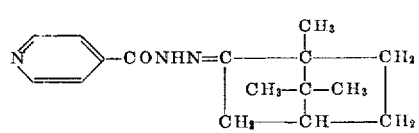

3. The d-3-camphocarboxylic acid isonicotinylhydrazone of the formula

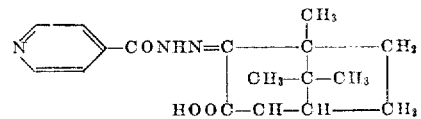

4. The compound d-10-camphosulfonic acid isonicotinylhydrazone of the formula

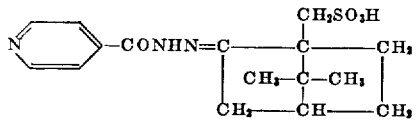

5. The compound d-3-camphosulfonic acid isonicotinylhydrazone of the formula

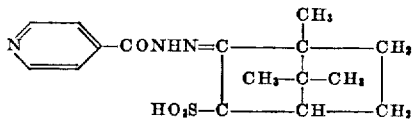

6. The d-8-camphosulfonic acid isonicotinylhydrazone compound of the formula

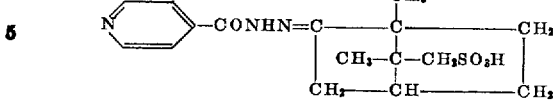

References Cited in the file of this patent

Sah et al.: Jour. of the Chinese Chem. Soc. (in English), vol. 14, pp. 45–51, 94–100, 31–8 and 24–30; abstracted by Chem. Abst., vol. 43, cols. 6972 (f), 6972 (i), 6973 (c), 6973 (f) (1946).

Sah et al.: Receueil des travaux chimiques des Pays-Bays, vol. 59, pp. 349–56 (1940).

Castillo: Chem. Abst., vol. 31, col. 3813 (3); (1936).

UNITED STATES PATENT OFFICE
Certificate of Correction

Patent No. 2,769,009                                                                         October 30, 1956

Gino Carrara

It is hereby certified that error appears in the printed specification of the above numbered patent requiring correction and that the said Letters Patent should read as corrected below.

Column 2, lines 67 to 71, claim 3, the formula should appear as shown below instead of as in the patent—

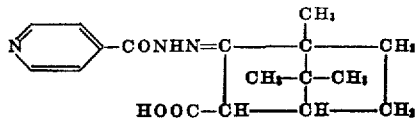

Signed and sealed this 24th day of September 1957.

[SEAL]

Attest:
KARL H. AXLINE,
*Attesting Officer.*

ROBERT C. WATSON,
*Commissioner of Patents.*